(12) United States Patent
Woods

(10) Patent No.: US 11,726,582 B2
(45) Date of Patent: Aug. 15, 2023

(54) METHOD AND SYSTEM UTILIZING PHASED ARRAY BEAMFORMING FOR SIX DEGREE OF FREEDOM TRACKING FOR AN EMITTER IN AUGMENTED REALITY SYSTEMS

(71) Applicant: Magic Leap, Inc., Plantation, FL (US)

(72) Inventor: Michael Janusz Woods, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/458,890

(22) Filed: Aug. 27, 2021

(65) Prior Publication Data
US 2022/0050533 A1 Feb. 17, 2022

Related U.S. Application Data

(63) Continuation of application No. PCT/US2020/020178, filed on Feb. 27, 2020.

(60) Provisional application No. 62/811,914, filed on Feb. 28, 2019.

(51) Int. Cl.
*G06F 3/0346* (2013.01)
*G06F 3/01* (2006.01)
(Continued)

(52) U.S. Cl.
CPC ....... *G06F 3/0346* (2013.01); *G02B 27/0087* (2013.01); *G06F 3/012* (2013.01); *G06F 3/016* (2013.01); *G01S 2013/0245* (2013.01)

(58) Field of Classification Search
CPC ........ G06F 3/0346; G06F 3/012; G06F 3/011; G06F 3/016; A63F 13/24; A63F 13/21;
(Continued)

(56) References Cited

U.S. PATENT DOCUMENTS 10,651,566 B2 * 5/2020 Adams ................. H01Q 21/062
2008/0190980 A1 8/2008 Overton
(Continued)

FOREIGN PATENT DOCUMENTS

WO 2020176779 A1 9/2020

OTHER PUBLICATIONS

Acres et al., "Tetrahedra and Relative Directions in Space Using 2 and 3-Space Simplexes for 3-Space Localization", Electrical Engineering and Systems Science, Signal Processing, Available Online at: https://arxiv.org/abs/1810.07316, Oct. 16, 2018, 28 pages.
(Continued)

*Primary Examiner* — Mihir K Rayan
(74) *Attorney, Agent, or Firm* — Kilpatrick Townsend & Stockton LLP

(57) ABSTRACT

An electromagnetic tracking system includes a handheld controller including a first phased array element characterized by a first phase and a second phased array element characterized by a second phase different than the first phase. The first phased array element and the second phased array element are configured to generate a steerable electromagnetic beam characterized by an electromagnetic field pattern. The electromagnetic tracking system also includes a head mounted augmented reality display including an electromagnetic sensor configured to sense the electromagnetic field pattern.

20 Claims, 8 Drawing Sheets

(51) Int. Cl.
*G02B 27/00* (2006.01)
*G01S 13/02* (2006.01)

(58) Field of Classification Search
CPC ...... A63F 13/235; A63F 13/428; A63F 13/92; G01S 2013/0245; G01S 13/02; G01S 13/426; G01S 13/88; G02B 2027/0187; G02B 27/0087; G02B 27/0093; G02B 27/017
See application file for complete search history.

(56) References Cited

U.S. PATENT DOCUMENTS

| | | | |
|---|---|---|---|
| 2012/0289338 A1* | 11/2012 | Chen | G06F 3/038 463/39 |
| 2016/0259404 A1* | 9/2016 | Woods | G06F 3/017 |
| 2017/0351094 A1 | 12/2017 | Poulos et al. | |
| 2018/0095529 A1* | 4/2018 | Tokubo | A63F 13/25 |
| 2019/0242952 A1* | 8/2019 | Schneider | G06F 3/017 |
| 2019/0326685 A1* | 10/2019 | Adams | H01Q 1/288 |

OTHER PUBLICATIONS

Application No. PCT/US2020/020178, International Preliminary Report on Patentability, dated Sep. 10, 2021, 7 pages.
Application No. PCT/US2020/020178, International Search Report and Written Opinion, dated Jun. 22, 2020, 10 pages.
PCT/US2020/020178, "Invitation to Pay Additional Fees and, Where Applicable, Protest Fee", Apr. 21, 2020, 2 pages.
Application No. EP20762410.7, "Partial Supplementary European Search Report", dated Mar. 28, 2022, 12 pages.
Application No. EP20762410.7, "Extended European Search Report", dated Jun. 28, 2022, 11 pages.

* cited by examiner

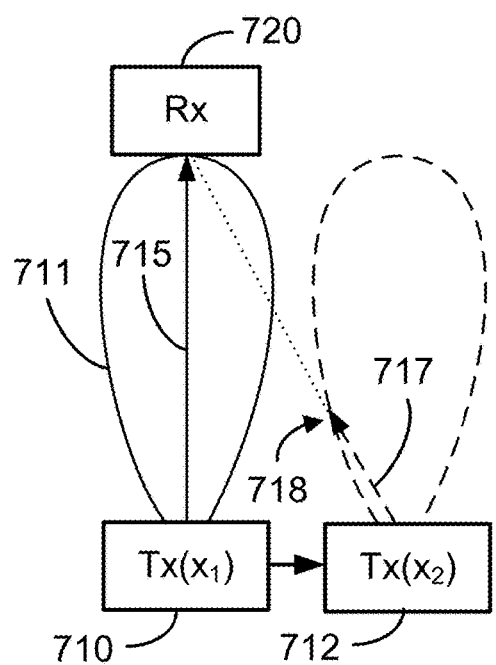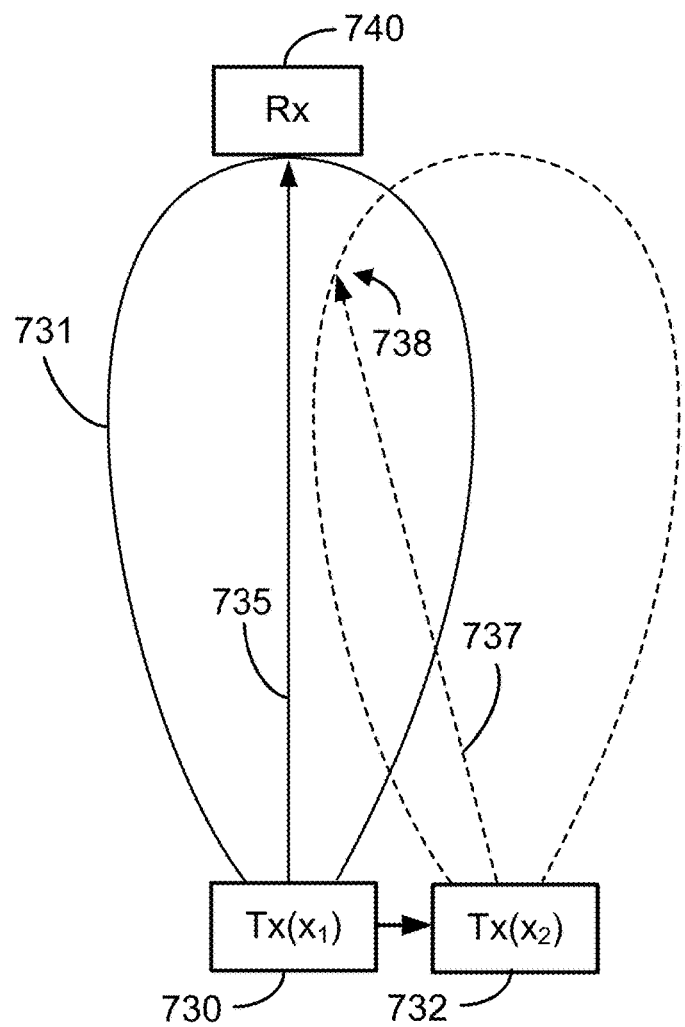
*FIG. 7A*  *FIG. 7B*

METHOD AND SYSTEM UTILIZING PHASED ARRAY BEAMFORMING FOR SIX DEGREE OF FREEDOM TRACKING FOR AN EMITTER IN AUGMENTED REALITY SYSTEMS

CROSS-REFERENCES TO RELATED APPLICATIONS

This application is a continuation of International Patent Application No. PCT/US2020/020178, filed Feb. 27, 2020, entitled "METHOD AND SYSTEM UTILIZING PHASED ARRAY BEAMFORMING FOX SIX DEGREE OF FREEDOM TRACKING FOR AND EMITTER IN AUGMENTED REALITY SYSTEMS" which claims the benefit of priority to U.S. Provisional Patent Application No. 62/811,914, filed Feb. 28, 2019, entitled "METHOD AND SYSTEM UTILIZING PHASED ARRAY BEAMFORMING FOR SIX DEGREE OF FREEDOM TRACKING FOR AN EMITTER IN AUGMENTED REALITY SYSTEMS," the entire disclosures of which are hereby incorporated by reference, for all purposes, as if fully set forth herein.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY

The present disclosure relates to virtual reality (VR) and/or augmented reality (AR) imaging and visualization systems. The present disclosure relates generally to methods and systems for performing six degree of freedom (DoF) tracking in a VR and/or AR system. More particularly, embodiments of the present disclosure provide methods and systems for directing energy transmitted by an emitter (also referred to as a transmitter) in order to compute the position and orientation of the emitter with respect to a sensor. In some embodiments, beamforming using phased array elements of the emitter are utilized to enable beam steering as described more fully herein. The disclosure is applicable to a variety of applications in computer vision and image display systems.

According to an embodiment of the present disclosure, an electromagnetic tracking system is provided. The electromagnetic tracking system includes a handheld controller including an electromagnetic emitter. The electromagnetic emitter includes a first phased array element characterized by a first phase and a second phased array element characterized by a second phase different than the first phase. The first phased array element and the second phased array element are configured to generate a steerable electromagnetic beam characterized by an electromagnetic field pattern. The electromagnetic tracking system also includes a head mounted AR display including an electromagnetic sensor configured to sense the electromagnetic field pattern.

According to another embodiment of the present disclosure, a method of determining a six DoF pose of a handheld controller is provided. The method includes determining a pose of an electromagnetic sensor and generating a electromagnetic beam from the handheld controller. The electromagnetic beam is characterized by an electromagnetic field pattern. The method also includes steering the electromagnetic beam to increase received power at the electromagnetic sensor and determining a beam angle associated with the electromagnetic beam. The method further includes determining a distance between the handheld controller and the electromagnetic sensor and determining the six DoF pose of the handheld controller using the pose of the electromagnetic sensor, the beam angle, and the distance.

Numerous benefits are achieved by way of the present disclosure over conventional techniques. For example, embodiments of the present disclosure provide methods and systems that increase electromagnetic field strength at a sensor in a predetermined manner. Embodiments of the present disclosure enable active tracking of emitter position, thereby increasing accuracy in pose determination. These and other embodiments of the disclosure along with many of its advantages and features are described in more detail in conjunction with the text below and attached figures.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 7A schematically illustrates variation in received signal as a function of two emitter positions, according to some embodiments.

FIG. 7B schematically illustrates variation in received signal as a function of two emitter positions, according to other embodiments.

DETAILED DESCRIPTION OF SPECIFIC EMBODIMENTS

Augmented reality (AR) systems can be designed to be interactive with a user. As an example, the user may be provided with a handheld controller, also referred to as a totem, that the user can utilize to interact with the AR system. Accordingly, it is useful to be able to determine the position and orientation (e.g., 6 degrees of freedom (DoF) pose) of the handheld controller with respect to other elements of the AR system, including a head-worn display system, also referred to as an AR headset or a headset, worn by the user.

One approach to achieve high precision localization may involve the transmission and detection of electromagnetic fields. For example, electromagnetic fields may be emitted by at least one electromagnetic field emitter (referred to generally as an "emitter") and received by at least one electromagnetic field sensor (referred to generally as a "sensor"). The emitter(s) and sensor(s) may be strategically placed on the user's AR headset, belt pack, and/or other ancillary devices (e.g., totems, haptic devices, gaming instruments, etc.). The emitter(s) generate an electromagnetic field having a known spatial (and/or temporal) distribution in an environment of the user of the AR headset. The sensor(s) measure the generated electromagnetic fields at the location(s) of the sensor(s). Based on these measurements and knowledge of the distribution of the generated electromagnetic field, a pose (e.g., a position and/or orientation) of the sensor(s) relative to the emitter(s) can be determined. Accordingly, the pose of an object to which the sensor(s) and/or the emitter(s) are attached can be determined. That is, the relative position of the sensor(s) and the emitter(s) may be determined.

Figure 1:
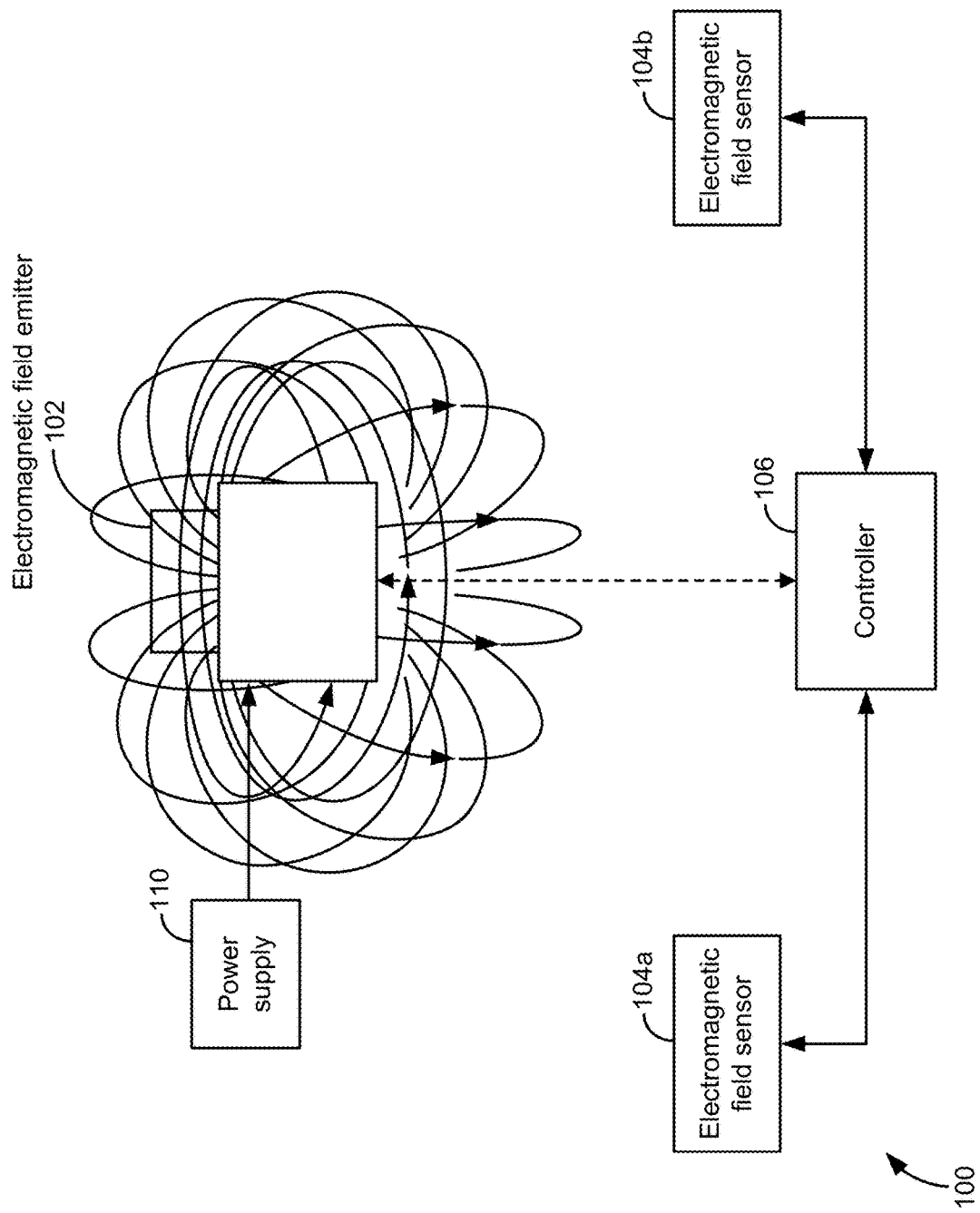
FIG. 1 schematically illustrates a system diagram of an electromagnetic (EM) tracking system, according to some embodiments.

FIG. 1 illustrates an example system diagram of an electromagnetic tracking system 100. In some embodiments, the electromagnetic tracking system 100 includes one or more electromagnetic field emitters 102 (referred to generally as "emitter 102") that is configured to emit a known electromagnetic field. As shown in FIG. 1, the emitter 102 may be coupled to a power supply 110 (e.g., electric current, batteries, etc.) to provide power to the emitter 102.

In some embodiments, the emitter 102 includes several coils (e.g., at least three coils positioned perpendicular to each other to produce fields in the X, Y and Z directions) that generate electromagnetic fields. The coils can be operated at a predetermined AC frequency (e.g., in the range of 20 kHz-40 kHz) such that each coil generates an AC dipole shaped electromagnetic field. This electromagnetic field is used to establish a coordinate space (e.g., an X-Y-Z Cartesian coordinate space). This allows the system to map a position of electromagnetic sensors 104a, 104b (e.g., an (X,Y,Z) position) in relation to the known electromagnetic field, and determine a position and/or orientation of the electromagnetic sensors 104a, 104b. In some embodiments, the electromagnetic sensors 104a, 104b (referred to generally as "sensors 104") may be attached to one or more real objects. The sensors 104 may include coils in which current may be induced through an electromagnetic field, for example, the electromagnetic field emitted by the emitter 102. The sensors 104 may include coils or loops (e.g., at least three coils positioned perpendicular to each other) that are positioned/oriented to capture incoming electromagnetic flux from the electromagnetic field, for example the electromagnetic field emitted by the emitter 102, and by comparing currents induced through these coils, and knowing the relative positioning and orientation of the coils relative to each other, relative position and orientation of the sensors 104 relative to the emitter 102 may be calculated.

One or more parameters pertaining to a behavior of the coils and inertial measurement unit (IMU) components operatively coupled to the sensors 104 may be measured to detect a position and/or orientation of the sensors 104 (and the object to which it is attached to) relative to a coordinate system to which the emitter 102 is coupled. In some embodiments, multiple sensors 104 may be used in relation to the emitter 102 to detect a position and orientation of each of the sensors 104 within the coordinate space. The electromagnetic tracking system 100 may provide positions in three directions (e.g., X, Y and Z directions), and further in two or three orientation angles. In some embodiments, measurements of the IMU may be compared to the measurements of the coil to determine a position and orientation of the sensors 104. In some embodiments, both electromagnetic (EM) data and IMU data, along with various other sources of data, such as cameras, depth sensors, and other sensors, may be combined to determine the position and orientation. This information may be transmitted (e.g., wireless communication, Bluetooth, etc.) to a controller 106. In some embodiments, pose (or position and orientation) may be reported at a relatively high refresh rate in conventional systems.

Figure 3:
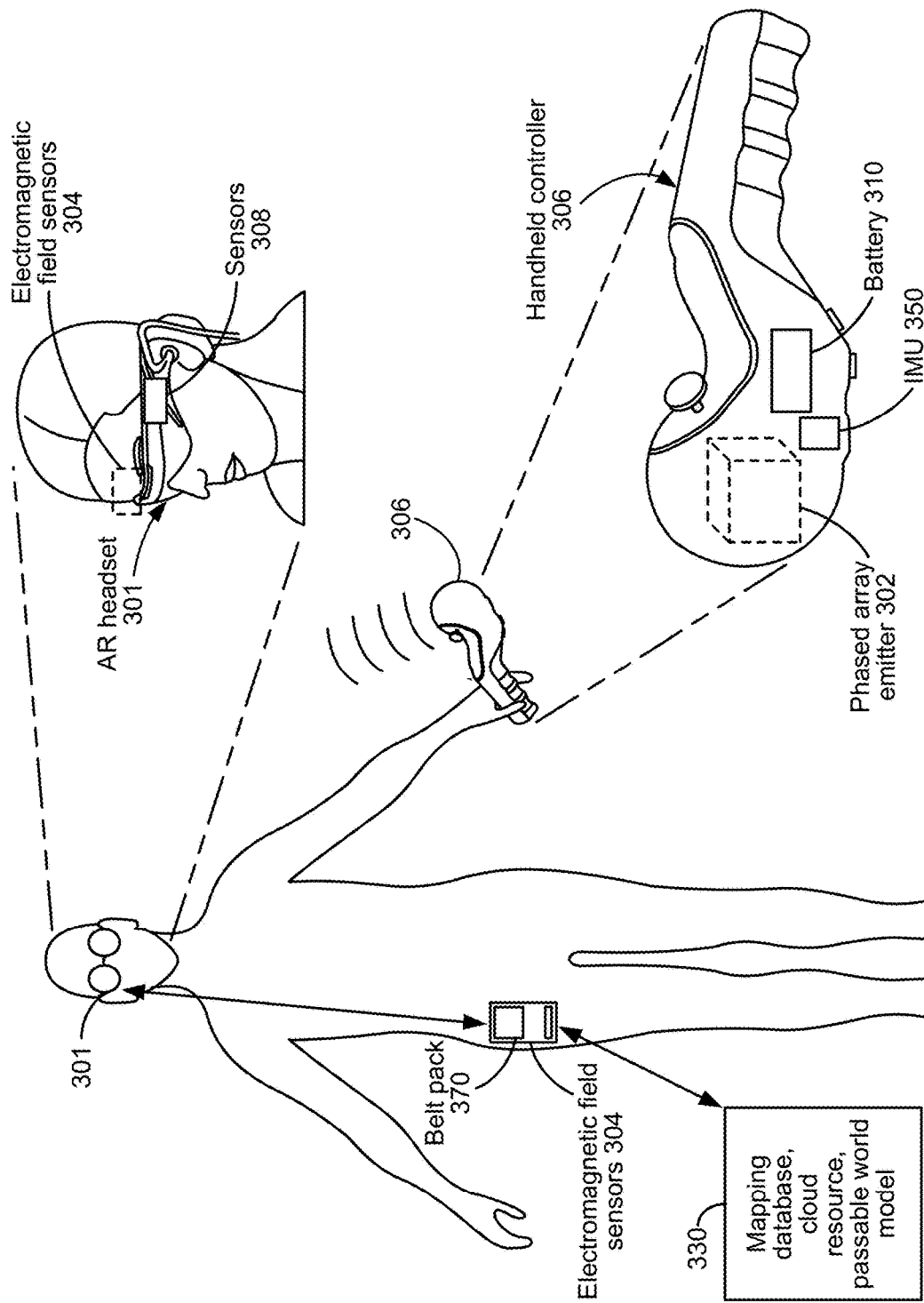
FIG. 3 schematically illustrates an electromagnetic tracking system incorporated with an augmented reality (AR) system, according to some embodiments.

Conventionally, an electromagnetic field emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 3, various features of the electromagnetic tracking system may be employed to produce a configuration wherein changes or deltas in position and/or orientation between two objects that move in space relative to a more stable global coordinate system may be tracked. In other words, a configuration is shown in FIG. 3 wherein a variation of an electromagnetic tracking system may be utilized to track position and orientation delta (change) between a head-mounted component and a hand-held component, while head pose relative to the global coordinate system (say of the room environment local to the user) is determined otherwise, such as by simultaneous localization and mapping (SLAM) techniques using outward-capturing cameras which may be coupled to the head mounted component of the system.

The controller 106 may control the emitter 102 and may also capture data from the sensors 104. It should be appreciated that the various components of the system may be coupled to each other through any electro-mechanical or wireless/Bluetooth means. The controller 106 may also include data regarding the known electromagnetic field, and the coordinate space in relation to the electromagnetic field. This information is then used to detect the position and orientation of the sensors 104 in relation to the coordinate space corresponding to the known electromagnetic field.

One advantage of electromagnetic tracking systems is that they produce high resolution, highly repeatable tracking results with minimal latency. Additionally, electromagnetic tracking systems do not necessarily rely on optical trackers, and sensors/objects not in the user's line-of-vision may be easily tracked.

It should be appreciated that the strength of the electromagnetic field, V, drops as a cubic function of distance, r, from a coil emitter (e.g., the emitter 102). Thus, an algorithm may be used based on a distance away from the emitter 102. The controller 106, which may also be referred to as a processor, may be configured with such algorithms to determine a position and orientation of the sensors 104 at varying distances away from the emitter 102. Given the rapid decline of the strength of the electromagnetic field as the sensors 104 move farther away from the emitter 102, best results, in terms of accuracy, efficiency and low latency, may be achieved at closer distances. In typical electromagnetic tracking systems, an emitter is powered by an electric current (e.g., plug-in power supply) and sensors are located within a 20 feet radius of the emitter. A shorter radius between the sensors and emitter may be more desirable in many applications, including AR applications.

Figure 2:
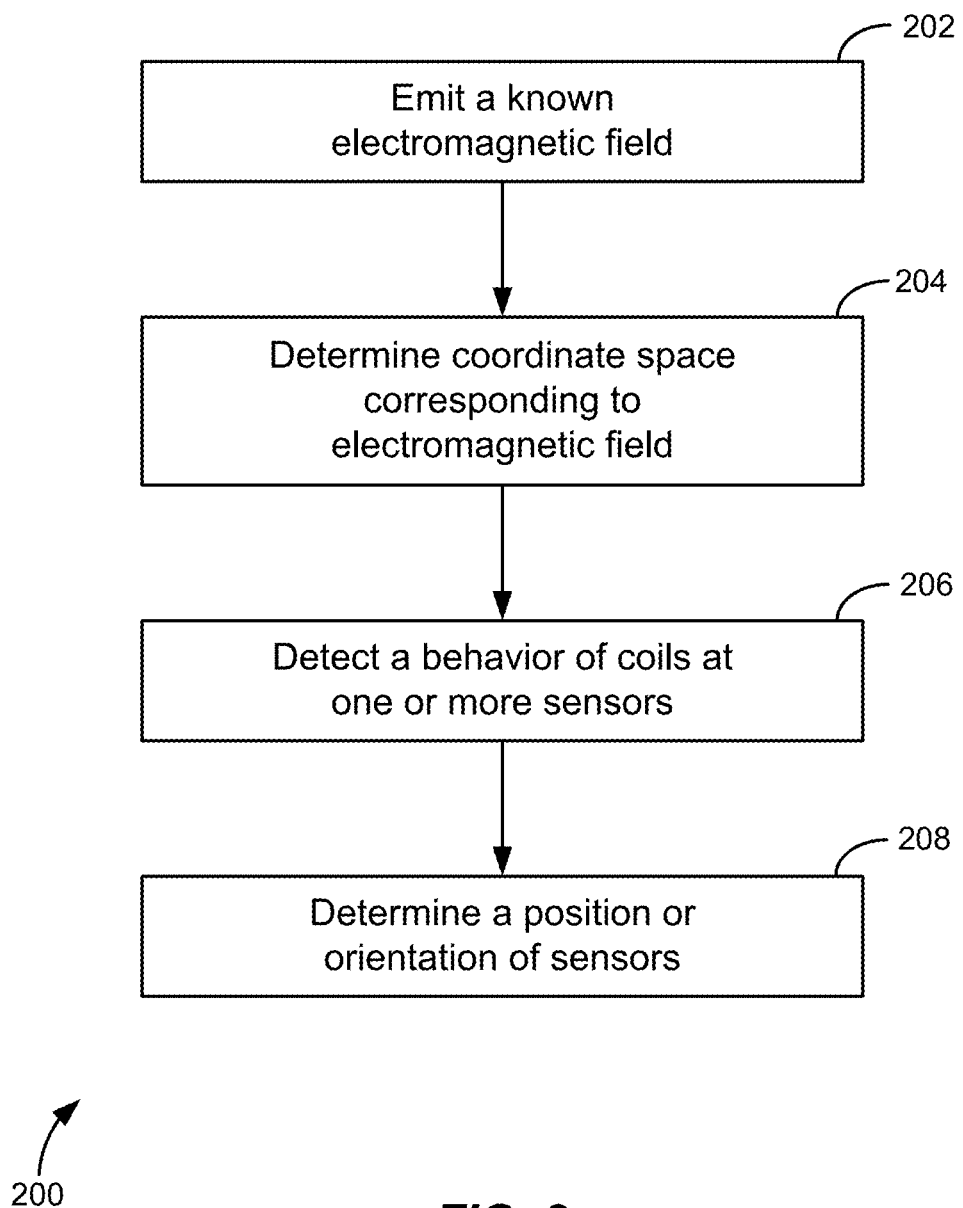
FIG. 2 is a flowchart describing functioning of an electromagnetic tracking system, according to some embodiments.

FIG. 2 illustrates an example flowchart for a method 200 describing a functioning of an electromagnetic tracking system, such as the electromagnetic tracking system 100. At 202, a known electromagnetic field is emitted. In some embodiments, an electromagnetic field emitter may generate electromagnetic fields. For example, each coil of the electromagnetic field emitter may generate an electromagnetic field in one direction (e.g., X, Y or Z). The electromagnetic fields may be generated with an arbitrary waveform. In some embodiments, the electromagnetic field component along each of the axes may oscillate at a slightly different frequency from other electromagnetic field components along other directions. At 204, a coordinate space corresponding to the electromagnetic field may optionally be determined. For example, a controller may automatically determine a coordinate space around the emitter and/or sensors based on the electromagnetic field. In some embodiments, the coordinate space may not be determined at this stage of the method. At 206, a behavior of coils at the sensors (which may be attached to a known object) may be detected. For example, a current induced at the coils may be calculated. In some embodiments, a rotation of coils, or any other quantifiable behavior may be tracked and measured. At 208, this behavior may be used to detect a position or orientation of the sensors and/or a known object (e.g., AR headset which includes the sensors) with respect to the emitter, or vice versa. For example, the controller 106 may consult a mapping table that correlates a behavior of the coils at the sensors to various positions or orientations. Based on these calculations, the position in the coordinate space along with the orientation of the sensors and/or emitters may be determined.

In the context of AR systems, one or more components of the electromagnetic tracking system may need to be modified to facilitate accurate tracking of mobile components (e.g., emitter and sensors). As described above, tracking a head pose of the user and orientation may be desirable in many AR applications. Accurate determination of the head pose and orientation of the user allows the AR system to display the appropriate/relevant virtual content to the user. For example, the virtual scene may include a virtual monster hiding behind a real building. Depending on the pose and orientation of the head of the user in relation to the building, the view of the virtual monster may need to be modified such that a realistic AR experience is provided. Or, a position and/or orientation of a totem, haptic device or some other means of interacting with virtual content may be important in enabling a user to interact with an AR system. For example, in many gaming applications, the AR system can detect a position and orientation of a real object in relation to virtual content. Or, when displaying a virtual interface, a position of a totem, a hand of a user, a haptic device or any other real object configured for interaction with the AR system can be known in relation to the displayed virtual interface in order for the system to understand a command, interaction, and the like. Some localization methods such as optical tracking may be plagued with high latency and low resolution problems, which makes rendering virtual content challenging in many AR applications.

In some embodiments, the electromagnetic tracking system, discussed in relation to FIGS. 1 and 2 may be adapted to the AR system to detect position and orientation of one or more objects in relation to an emitted electromagnetic field. Typical electromagnetic tracking systems tend to have large and bulky electromagnetic emitters (e.g., the emitter 102 in FIG. 1), which is problematic for head-mounted AR devices, for example, with a totem. However, smaller electromagnetic emitters (e.g., in the millimeter range) may be used to emit a known electromagnetic field in the context of the AR system.

FIG. 3 illustrates an electromagnetic tracking system that is incorporated with an AR system, with an electromagnetic field phased array emitter 302 (referred to generally as "phased array emitter 302") incorporated as part of a handheld controller 306. The handheld controller 306 can be movable independently relative to an AR headset 301 (or a belt pack 370). For example, the handheld controller 306 can be held in a hand of a user, or the handheld controller 306 could be mounted to a hand or arm of the user (e.g., as a ring or bracelet or as part of a glove worn by the user). In some embodiments, the handheld controller 306 may be a totem, for example, to be used in a gaming scenario (e.g., a multi-degree-of-freedom controller) or to provide a rich user experience in an AR environment or to allow user interaction with an AR system. In some embodiments, the handheld controller 306 may be a haptic device. In some embodiments, the phased array emitter 302 may be incorporated as part of the belt pack 370.

The handheld controller may include a battery 310 or other power supply that powers phased array emitter 302. It should be appreciated that phased array emitter 302 may also include or be coupled to an IMU 350 component configured to assist in determining positioning and/or orientation of the phased array emitter 302 relative to other components. This may be especially advantageous in cases where both the phased array emitter 302 and electromagnetic field sensors 304 (referred to generally as "sensors 304") are mobile. Placing phased array emitter 302 in the handheld controller 306 rather than the belt pack 307, as shown in the embodiment of FIG. 3, helps ensure that phased array emitter 302 is not competing for resources at belt pack 370, but rather uses its own battery source at handheld controller 306. In some embodiments, the phased array emitter 302 can be disposed on AR headset 301 and sensors 304 can be disposed on handheld controller 306 or belt pack 370. Thus, embodiments of the present disclosure provide implementations in which handheld controller 306 is implemented as a handheld unit, whereas in other embodiments, the handheld controller is implemented in AR headset 301, whereas in additional embodiments, the handheld controller is implemented in an auxiliary unit, for example, belt pack 307. Moreover, in addition to implementations in which handheld controller 306 is implemented in a single device, the functions of the handheld controller and the attendant physical components can be distributed across multiple devices, for example, the handheld controller 306, the AR headset 301, and/or an auxiliary unit such as the belt pack 307.

In some embodiments, the sensors 304 may be placed on one or more locations on the AR headset 301, along with other sensing devices or sensors 308 such as one or more IMUs or additional electromagnetic flux capturing coils. For example, as shown in FIG. 3, the sensors 304, 308 may be placed on one or both sides of the AR headset 301. Since the sensors 304, 308 may be engineered to be rather small (and may be less sensitive, in some cases), having multiple sensors 304, 308 may improve efficiency and precision. In some embodiments, one or more sensors may also be placed on belt pack 370 or any other part of the user's body. The sensors 304, 308 may communicate wirelessly, for example, through Bluetooth, to a computing apparatus that determines a pose and orientation of the sensors 304, 308 (and the AR headset 301 to which it is attached). In some embodiments, the computing apparatus may reside at the belt pack 370. In some embodiments, the computing apparatus may reside at the AR headset 301, or the handheld controller 306. In some embodiments, the computing apparatus may, in turn, include a mapping database 330 (e.g., mapping database, cloud resources, passable world model, coordinate space, and the like) to detect pose, to determine the coordinates of real objects and/or virtual objects, and may even connect to cloud resources and the passable world model. The handheld controller 306 is able, in some embodiments, to control timing of electromagnetic emission by the electromagnetic emitter and sensing by the electromagnetic sensor such that the position and orientation of the electromagnetic emitter and the electromagnetic sensor are computed based on the field from the modified electromagnetic field pattern. In some embodiments, a position and orientation of the electromagnetic emitter is computed relative to the electromagnetic sensor. In other embodiments, a position and orientation of the electromagnetic sensor is computed relative to the electromagnetic emitter. In some embodiments, a position and orientation of the electromagnetic emitter and the electromagnetic sensor are computed.

As described above, some electromagnetic emitters may be too bulky for AR devices. Therefore the emitter may be engineered to be compact using smaller components (e.g., coils) than traditional systems. However, given that the strength of the electromagnetic field decreases as a cubic function of the distance away from the emitter, a shorter radius between the sensors 304 and the phased array emitter 302 (e.g., about 3 to 3.5 ft.) may reduce power consumption when compared to traditional systems such as the one detailed in FIG. 1.

In some embodiments, this aspect may either be utilized to prolong the life of the battery 310 that may power the handheld controller 306 and the phased array emitter 302, in one or more embodiments. In some embodiments, this aspect may be utilized to reduce the size of the coils generating the electromagnetic field at phased array emitter 302. However, in order to get the same strength of electromagnetic field, the power may be need to be increased. This allows for a compact phased array emitter 302 that may fit compactly in handheld controller 306.

Several other changes may be made when using the electromagnetic tracking system for AR devices. Although this pose reporting rate is rather good, AR systems may benefit from an even more efficient pose reporting rate. To this end, IMU-based pose tracking may (additionally or alternatively) be used. Advantageously, the IMUs may remain as stable as possible in order to increase an efficiency of the pose detection process. The IMUs may be engineered such that they remain stable up to 50-100 milliseconds. It should be appreciated that some embodiments may utilize an outside pose estimator module (e.g., IMUs may drift over time) that may enable pose updates to be reported at a rate of 10 to 20 Hz. By keeping the IMUs stable at a reasonable rate, the rate of pose updates may be dramatically decreased to 10 to 20 Hz (as compared to higher frequencies in traditional systems).

If the electromagnetic tracking system can be run at, for example, a 10% duty cycle (e.g., only pinging for ground truth every 100 milliseconds), the AR system may save power. This may mean that the electromagnetic tracking system wakes up every 10 milliseconds out of every 100 milliseconds to generate a pose estimate. This may directly translate to power consumption savings, which may, in turn, affect size, battery life and cost of the AR device (e.g., the AR headset 301 and/or the controller 306).

In some embodiments, this reduction in duty cycle may be strategically utilized by providing a second handheld controller (not shown) rather than just one handheld controller 306 as illustrated in FIG. 3. For example, the user may be playing a game that requires two controllers, and the like. Or, in a multi-user game, two users may have their own controllers to play the game. When two controllers (e.g., symmetrical controllers for each hand) are used rather than one, the controllers may operate at offset duty cycles. The same concept may also be applied to controllers utilized by two different users playing a multiplayer game.

Although some embodiments of the present disclosure are discussed in the context of the use of a phased array of electromagnetic elements in an electromagnetic emitter, embodiments of the present disclosure are not limited to the use of electromagnetic radiation and other forms of energy can be used to perform beamforming, including acoustic energy (i.e., sound), resulting in an energy distribution characterized by regions of constructive interference and regions of destructive interference.

In order to determine the six DoF pose (i.e., the position and orientation) of the handheld controller 306 with respect to the AR headset 301, magnetic tracking can be utilized. Using an emitter disposed in the handheld controller, a magnetic field of known geometry can be created. One or more sensors in the headset can then be used to determine, on the basis of measurements of the location of the AR headset in the known geometry, the six DoF relationship between the handheld controller and the AR headset. In some cases, measurement data provided by an IMU can be utilized, for example, in the context of sensor fusion, to compute or improve measurements of six DoF pose of the handheld controller. However, although IMUs may be suitable for measuring relative motion, they can have a level of bias associated with their measurement data. As this bias is integrated, drift in the position of the IMU can accumulate, degrading the measurement accuracy. Accordingly, embodiments of the present disclosure provide measurement data that is characterized by reduced bias. In some embodiments, although the measurement data can include a noise component, the reduction in bias enables averaging of the noise to provide a signal with improved accuracy.

Figure 4:
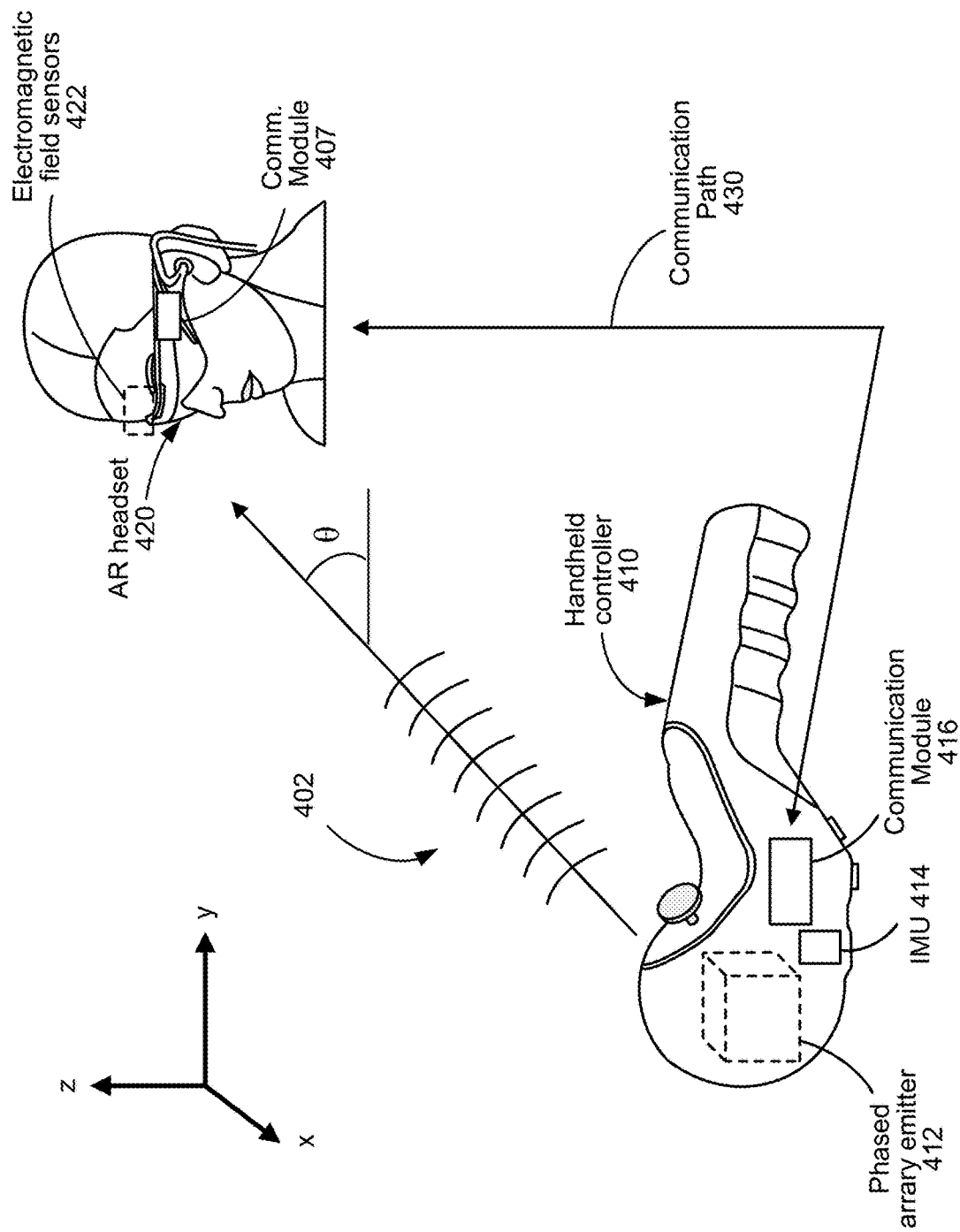
FIG. 4 schematically illustrates electromagnetic tracking using a steered beam in the context of an AR device, according to some embodiments.

FIG. 4 schematically illustrates electromagnetic tracking using a steered beam in the context of an AR device, according to some embodiments. As described more fully below, emitted beam 402 emitted by handheld controller 410 is directed at a beam angle θ. Knowing the phase delay relationship between individual phased array elements in the phased array emitter 412, the beam angle θ can be computed. A feedback loop implemented using a bidirectional communication path 430 (e.g., Bluetooth) can then be utilized such that the phase delays associated with each of the phased array elements in phased array emitter 412 are adjusted to steer the beam and achieve/maintain the maximum value of received power at the electromagnetic field sensors 422 of the AR headset 420. As described more fully herein, the communication path 430 enables data related to the handheld controller 410 to be transmitted to the AR headset 420, for example, handheld controller IMU data, phase delays of the individual phased array elements in the phased array emitter 412, the beam angle θ, and the like. Moreover, the communication path 430 enables data related to the AR headset 420 to be transmitted to the handheld controller 410, for example, AR headset IMU data, received power at the electromagnetic field sensors 422, and the like. The beam angle θ of the emitted beam 402 may be swept and steered to maximize the received energy at the AR headset 420, and more specifically at the electromagnetic field sensors 422.

Given the phase delays of the individual phased array elements in the phased array emitter 412 and the distance between the handheld controller 410 and the AR headset 420, which can be computed based on characteristics of the emitted beam 402 as described more fully below, a six DoF pose of the handheld controller 410 can be determined relative to the known pose of the AR headset 420.

Figure 5A:
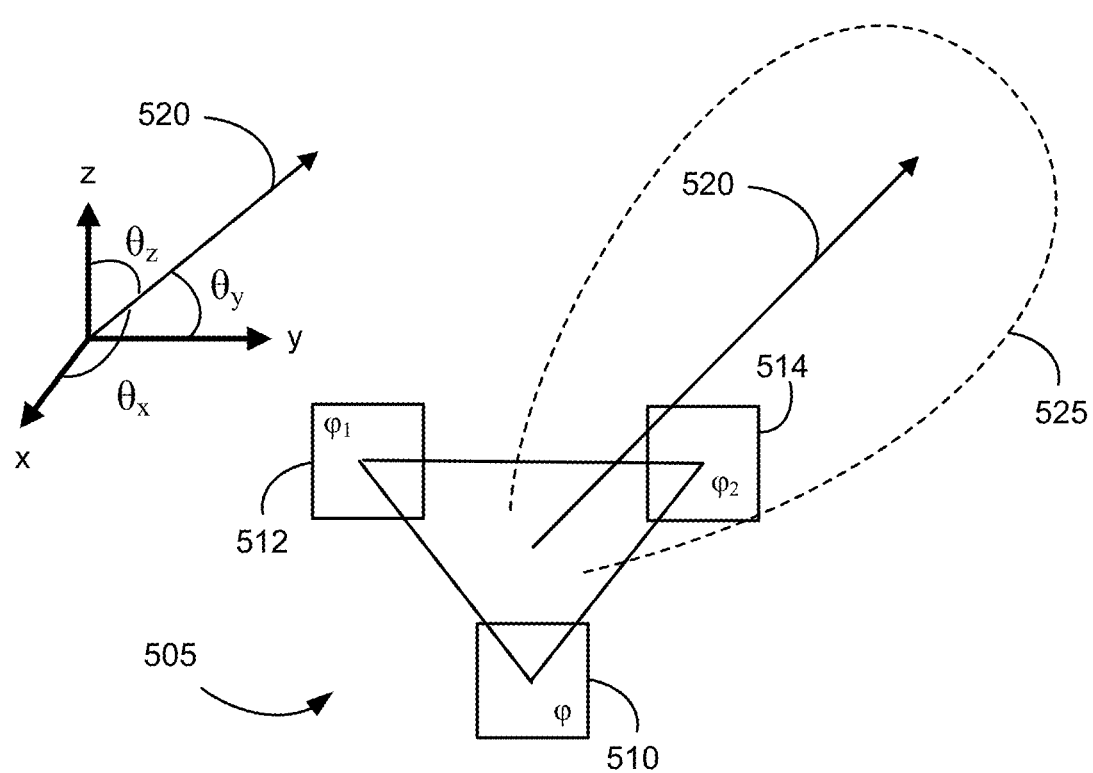
FIG. 5A schematically illustrates a set of three electromagnetic sources generating a steered beam at a predetermined angle, according to some embodiments.

FIG. 5A schematically illustrates a set of three electromagnetic sources (e.g., individual phased array elements) generating a steered beam at a predetermined angle, according to some embodiments. As illustrated in FIG. 5A, three phased array elements 510, 512, and 514 are included as elements of a phased array emitter 505, which is disposed in a handheld controller (e.g., the phased array emitter 412 in FIG. 4). In some embodiments, each of the phased array elements 510, 512, and 514 can be a coil operated at a predetermined AC frequency (e.g., in the range of 20 KHz-40 KHz) such that each coil generates an AC dipole shaped electromagnetic field. In the exemplary phased array emitter 505, all of the phased array elements 510, 512, 514 have their coils aligned with a common direction, for example, the z-direction. Generally, the relative orientation and arrangement of the phased array elements 510, 512, 514 is selected so that a main lobe produced by the phased array emitter 505 is directed along a most common direction that an AR headset (e.g., the AR headset 420 in FIG. 4) will be relative to a handheld controller (e.g., the handheld controller 410 in FIG. 4) during normal operation (e.g., the handheld controller held in a hand of a user at about waist/mid-torso level with the palm of the hand facing to the left or the right depending on which hand the user utilizes to hold the handheld controller). This most common direction that the AR headset (e.g., AR headset 301) will be relative to the handheld controller (e.g., the handheld controller 306) during normal operation is illustrated in FIG. 3.

As electromagnetic radiation is emitted by each of the phased array elements 510, 512, 514, the wave nature of the electromagnetic radiation emitted results in interference between the electromagnetic radiation emitted by the phased array elements 510, 512, and 514. This interference produces regions of constructive interference and regions of destructive interference. For the phased array elements 510, 512, and 514 illustrated in FIG. 5A, if the phase of each element is aligned (i.e., no delay between elements), a main lobe will be produced along the x-direction orthogonal to the plane of the figure. If a fixed phase delay relationship is implemented between the phased array elements (i.e., the phased array element 510 having phase delay φ, which may be zero, the phased array element 512 having phase delay $φ_1$, and the phased array element 514 having phase delay $φ_2$), the interference between the phased array elements 510, 512, and 514 will result in generation of a main lobe 525, as well as side lobes (not illustrated for purposes of clarity). In some embodiments, the phased array elements 510, 512, and 514 will be positioned such that the y-z plane illustrated in FIG. 5A will be orthogonal to the beam angle θ illustrated in FIG. 4 in order to generally align the main lobe for no phase delays with the most common direction between the handheld controller and the AR headset. Although three phased array elements are illustrated in FIG. 5A, embodiments of the present disclosure are not limited to this particular number and other numbers, including two phased array elements and more than three phased array elements can be utilized by embodiments of the present disclosure.

In some embodiments, a single coil can be utilized for each phased array element. In some embodiments, multiple coils can be utilized for each phased array element. As an example, to improve performance when the handheld controller is rotated 90° with respect to the most common direction that the AR headset will be relative to the handheld controller, a second coil for each phased array element can be utilized to increase the strength of the main lobe in a direction pointing into/out of the plane of the figure (i.e., the ±x-direction). In addition to the phased array elements of the handheld controller, the emitter can be implemented as a three coil emitter as illustrated by the electromagnetic field emitter 102 in FIG. 1.

Thus, although the three phased array elements 510, 512, and 514 are static (i.e., their position in the handheld controller is fixed), control of the phase delay associated with each phased array element can enable steering of the main lobe 525. As illustrated in FIG. 5A, the main lobe 525 is centered on a vector 520, which is oriented at a beam angle θ having components $θ_x$, $θ_y$, and $θ_z$ along the x-axis, y-axis, and z-axis, respectively. The vector 520 can be referred to as a central vector since it is aligned with the center of the main lobe. By modifying the phase delays $φ_1$ and/or $φ_2$, the main lobe 525 can be steered such that the vector 520 can be oriented at an arbitrary beam angle θ. Although only the phase delays $φ_1$ and/or $φ_2$, corresponding to the phased array elements 512 and 514, are modified in this example, it will be appreciated that an additional phase delay φ can be associated with the phased array element 510 in conjunction with control over the beam angle θ associated with the main lobe 525. When the additional phase delay φ is utilized, all three phase delays can be controlled to achieve the desired phase delays between the phased array elements 510, 512, 514. One of ordinary skill in the art would recognize many variations, modifications, and alternatives.

Beam steering of the main lobe 525 can be used to align the vector 520 with the vector directed from the phased array emitter 505 disposed in the handheld controller to electromagnetic field sensors (e.g., the electromagnetic field sensors 422) in the AR headset. Once the vector 520 directed from the phased array emitter 505 disposed in the handheld controller and the electromagnetic field sensors in the AR headset are aligned, the energy received at the electromagnetic field sensor will be maximized since the center of the main lobe 525 will be directed to the electromagnetic field sensor. As described more fully in relation to FIG. 6, beam steering of the main lobe 525 will be utilized to determine the orientation of the handheld controller with respect to the AR headset.

Although description is provided herein of placement of the phased array emitter in the handheld controller and placement of the electromagnetic field sensors in the AR headset, this is not required by the present disclosure and the phased array emitter can be placed in the AR headset, with the corresponding electromagnetic field sensors placed in the handheld controller. Additionally, in some embodiments, the phased array emitter or the electromagnetic field sensors can be placed in the auxiliary unit. Typically, the handheld controller can support the power requirements and the weight associated with operation of the phased array emitter and, as a result, the phased array emitter will be implemented as a component disposed in the handheld controller. Referring to FIG. 3, the computational work can be performed in the handheld controller 306, the AR headset 301, the belt pack 370, or a small cell (not illustrated) or distributed between these elements as appropriate. One of ordinary skill in the art would recognize many variations, modifications, and alternatives.

Figure 5B:
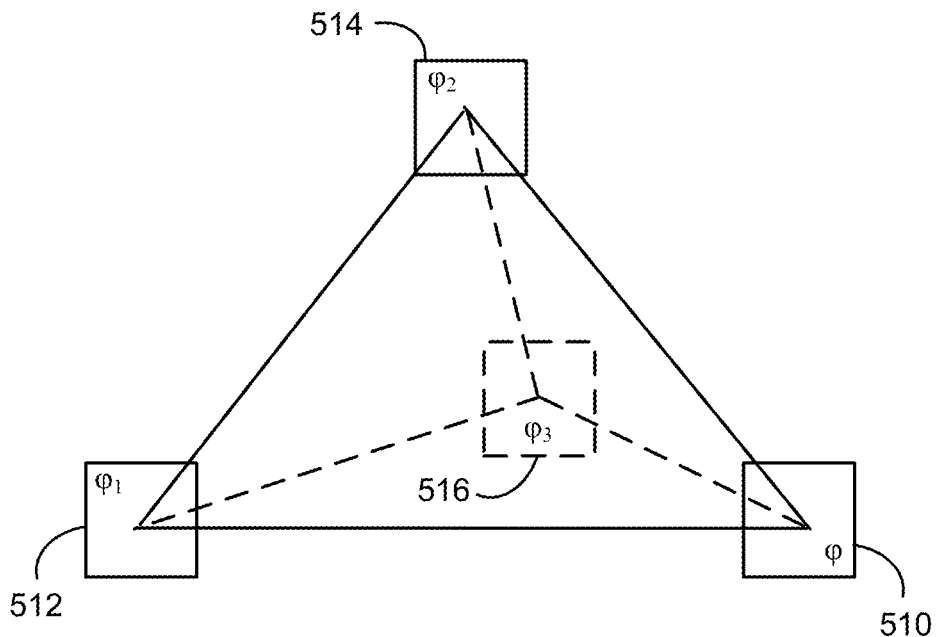
FIG. 5B schematically illustrates a set of four electromagnetic sources in a tetrahedral arrangement, according to some embodiments.

FIG. 5B schematically illustrates a set of four electromagnetic sources in a tetrahedral arrangement, according to some embodiments. As illustrated in FIG. 5B, four phased array elements 510, 512, 514, and 516 are positioned to lie on the four vertices of a tetrahedron. The phased array elements 510, 512, and 514 lie in the y-z plane while the phased array element 516 is positioned at a predetermined height above the y-z plane measured along the x-axis. By utilizing the tetrahedral arrangement illustrated in FIG. 5B, additional control is provided over a beam shape of a main lobe as well as increased control for beam steering in the y-z plane.

Figure 6:
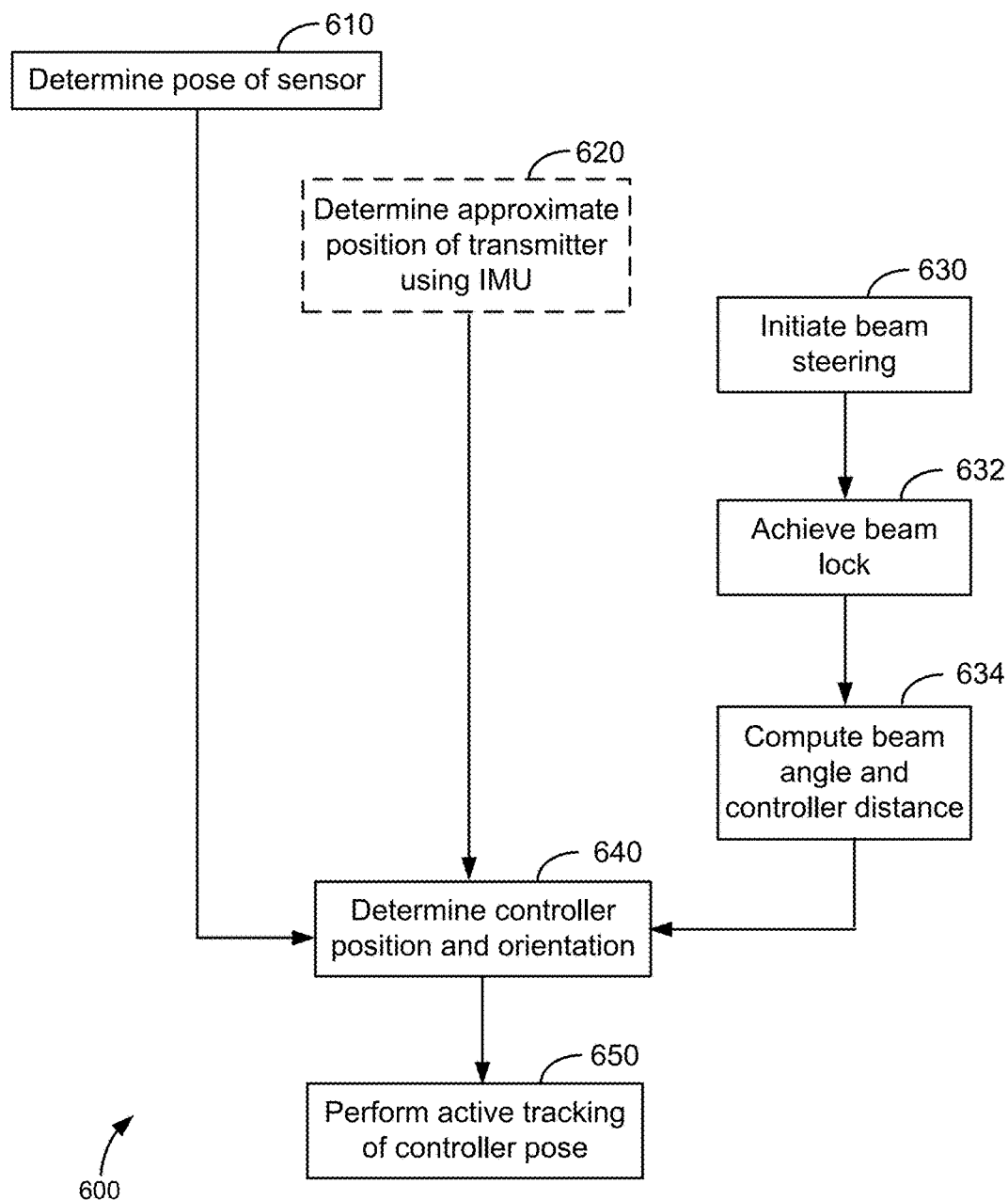
FIG. 6 is a flowchart illustrating a method of tracking handheld controller position, according to some embodiments.

FIG. 6 illustrates an example flowchart illustrating a method 600 of tracking a handheld controller position, according to some embodiments. The method includes determining a pose (i.e., position and orientation) of an electromagnetic field sensor (610). In some embodiments, determining the pose of the electromagnetic field sensor may include determining a head pose of an AR headset including the electromagnetic field sensor. In some embodiments, only the position of the electromagnetic field sensor can be determined. In some embodiments, one or more IMUs in the AR headset can be used to provide this head pose determination. The method also includes the optional process of determining an approximate position of an electromagnetic field emitter (e.g., a handheld controller), for example, using one or more IMUs in the electromagnetic field emitter (620). In some implementations, this optional process also determines the approximate orientation (i.e., the approximate pose) of the electromagnetic field emitter (e.g., a handheld controller), for example, using one or more IMUs in the electromagnetic field emitter. In some embodiments, the approximate pose can be determined based on acceleration due to gravity, which exceeds accelerations in directions orthogonal to gravity as a user is holding the handheld controller and calibrating or initializing the handheld controller.

Beam steering is then initiated (630) to steer a main lobe of an electromagnetic beam, for example, the main lobe 525 in FIG. 5. Using an optimization algorithm, also referred to as a search algorithm, the beam is steered until the energy received at the electromagnetic sensor is maximized. One of several optimization algorithms known to one of skill in the art can be utilized in this beam steering process. Typically, a fitness function F is maximized:

$$F = \max[\text{Power}_{received}(\Delta\varphi_1, \Delta\varphi_2)],$$

where $\Delta\varphi_1 = \varphi_1 - \varphi$ and $\Delta\varphi_2 = \varphi_2 - \varphi$, where $\varphi$ is the phase delay associated with the phased array element 510, $\varphi_1$ is the phase delay associated with the phased array element 512, and $\varphi_2$ is the phase delay associated with the phased array element 514. The phased array elements can be associated with operating frequencies as follows: the phased array element 510: $\omega t + \varphi$, where $\varphi$ can be zero; the phased array element 512: $\omega t + \varphi_1$; and the phased array element 514: $\omega t + \varphi_2$. As discussed above, beam steering can be accomplished through control of phase delays $\varphi_1$ and $\varphi_2$ or control of all three phases, $\varphi$, $\varphi_1$, and $\varphi_2$.

According to various embodiments, the beam steering process discussed herein can be implemented using beam steering information determined at the AR headset or at the handheld controller. For example, the following process flow can be implemented when beam steering information is determined at the AR headset. The handheld controller transmits an electromagnetic beam via a first communications path and transmits sensor data (e.g., sensor data collected at the handheld controller) via a second communications path. The AR headset receives the electromagnetic beam via the first communications path and receives the handheld controller sensor data via the second communications path.

The AR headset then calculates the power associated with the electromagnetic beam and determines beam steering information based on the calculated power associated with the electromagnetic beam, the handheld device sensor data, and the AR headset sensor data. Given this beam steering information, the AR headset transmits the beam steering information via the second communications path and the handheld controller receives the beam steering information. Accordingly, the handheld controller is able to change the beam steering properties of the electromagnetic beam based on the received beam steering information. For example, the received beam steering information may indicate that the handheld controller is to increase or decrease one or more of the phase delays $\varphi_1$ and $\varphi_2$. As another example, the AR headset may determine that, based the handheld device sensor data and the AR headset sensor data, that the handheld controller is moving with respect to the AR headset, and may accordingly generate beam steering information that causes the handheld controller to increase or decrease one or more of the phase delays $\varphi_1$ and $\varphi_2$ such that the main beam (e.g., the main lobe 525) and its corresponding vector (e.g., the vector 520) can continue to be aligned with the electromagnetic sensors in the AR headset.

Furthermore, the following process flow can be implemented when beam steering information is determined at the handheld controller. The handheld controller transmits an electromagnetic beam via first communications path and the AR headset receives the electromagnetic beam via the first communications path. The AR headset then calculates power associated with the electromagnetic beam and transmits the calculated power and AR headset sensor data to the handheld controller via the second communications path.

The handheld controller receives the calculated power and the AR headset sensor data and determines beam steering information based on the calculated power associated with the electromagnetic beam, the AR headset sensor data, and handheld controller sensor data. Accordingly, the handheld controller is able to change beam steering properties of the electromagnetic beam based on the received beam steering information.

In some embodiments, calibration processes can be utilized to account for system characteristics and to improve the accuracy of the beam steering algorithm. Moreover, a variety of control and optimization algorithms are suitable for use with embodiments of the present disclosure. Exemplary control and optimization algorithms that can be used to maximize the fitness function include gradient descent methods, stochastic gradient descent methods, gradient descent methods with momentum, deep learning algorithms, and the like. As an example, in an initialization phase, the beam may be steered by varying phase delays $\varphi_1$ and $\varphi_2$ by large amounts that result in large angle deviations (e.g., 10° increments) for the steered beam as the region around the handheld controller is analyzed. Returning to the beam angle (and associated phase delays) that provided the largest value of power received, smaller increments can be progressively utilized (e.g., 5°, 2°, 1°, 0.5°) to maximize the power received.

The initialization process may be informed by ergonomic studies that provide information related to the probability that the handheld controller will be oriented in a given direction with respect to the AR headset. As an example, if the handheld controller is typically held at waist/mid-torso level with the palm of the hand facing to the left, the initialization process can be initiated near angles aligned with the direction between the handheld controller and the AR headset in this orientation. This most common direction between the handheld controller and the AR headset is illustrated in FIG. 4 as beam angle θ. As will be evident to one of skill in the art, optimization algorithms that may provide for faster convergence are included within the scope of the present disclosure. Once beam lock has been achieved, angular adjustments of the beam steering angle can be decreased or increased as appropriate to the particular application. One of ordinary skill in the art would recognize many variations, modifications, and alternatives.

In operating these optimization algorithms, a communication path is provided between the handheld controller and the AR headset to exchange data collected during operation, for example, of the optimization algorithm. An example of the communication path 430 in FIG. 4 is a Bluetooth wireless link that provides for bidirectional communication between the handheld controller and the AR headset. This communication path can be used to transmit, for example, received power data from the AR headset to the handheld controller. Additionally, this communication path can be used to transmit information on the beam angle (e.g., the beam angle based on the phase delays or the phase delays for computation of the beam angle at the AR headset) from the handheld controller to the AR headset. Thus, the communication path 430 enables control signals and data to be transmitted in a bidirectional manner between the handheld controller and the AR headset. For example, IMU data generated in either the AR headset or the handheld controller can be transmitted through communication path 430. Although a Bluetooth wireless link is described as an example of the communication path 430, other communications technologies are included within the scope of the present disclosure, including WiFi wireless links, wired links such as a USB link, and the like.

In operation, the beam steering resulting from modification of the phase delays results in increases/decreases in received power at the AR headset. In response to changes in the received power at the electromagnetic field sensors in the AR headset, the electromagnetic field emitter in the handheld controller can vary the phase delays between phased array elements to steer the beam in a manner that increases the received power.

As described above, once the beam has been steered to align the vector passing through the center of the main lobe and the vector directed from the phased array emitter in the handheld controller to the electromagnetic field sensors, which can also be referred to as a receiver, in the AR headset, the energy received at the electromagnetic field sensor will be maximized. Thus, using feedback from the electromagnetic field sensor in the AR headset to the phased array emitter in the handheld controller transmitted through the communication path, beam steering to maximize received power (and to maintain received power in some embodiments) can be accomplished.

Referring once again to FIG. 6, once the beam has been steered to maximize received power, an indicator can be generated to indicate achievement of beam lock (632). Achieving beam lock will be associated with a given direction between the handheld controller and the AR headset at a given time. As the handheld controller (and/or the AR headset) moves as a function of time, the tracking algorithm will run continuously to maintain beam lock through beam steering. Data provided by the IMU in the handheld controller and/or the IMU in the AR headset may be utilized by the initialization and/or tracking algorithms, for example, to reduce the angular step size deviation in response to small changes in handheld controller and AR headset position and/or orientation, velocity, acceleration, or the like or to increase the angular step size deviation in response to large changes in handheld controller and AR headset position and/or orientation, velocity, acceleration, or the like. In some embodiments, the angular step size deviation is modified in response to angular velocity and/or acceleration of the handheld controller since rotation of the handheld controller can result in rapid steering of the emitted beam.

When the energy at the electromagnetic field sensors achieves a maximum value, the beam angle θ at which the main lobe is oriented, can be determined as a function of the phase delays $\varphi_1$ and $\varphi_2$ associated with phased array elements 512 and 514, respectively (634). In other words, given the phase delays $\varphi_1$ and $\varphi_2$ and the geometrical arrangement of the phased array elements 510, 512, and 514, the beam angle θ can be computed as a function of the phase delays and the geometrical arrangement. Given the beam angle θ between the handheld controller and the AR headset, it is known that the handheld controller and the AR headset are disposed along the vector connecting the handheld controller and the AR headset. To this information, the distance between the handheld controller and the AR headset is determined, as described more fully below, and added (634).

Embodiments of the present disclosure utilize one of several techniques to determine the distance between the handheld controller and the AR headset. For example, in some embodiments, the measured power can be compared to a calibrated table or function relating received power to distance. Utilizing the communication path, IMU data from the handheld controller can be fused with measured power at the AR headset to refine the distance computation. In some embodiments, the known electromagnetic field pattern can be used to determine the distance between the handheld controller and the AR headset given the received power. As an example, for a given electromagnetic field pattern and a given distance, steering of the main lobe by a predetermined angle (e.g., 5°) will result in a decrease in received power by a predetermined amount (e.g., 10%). At a greater distance (e.g., twice the distance), steering of the main lobe by the predetermined angle will result in a smaller decrease in received power (e.g., 20%). Once the received power has been maximized, the phase delays can be varied to steer the beam by the predetermined angle (for example, through a series of angles) and the decrease(s) in received power can be used to compute the distance. One of ordinary skill in the art would recognize many variations, modifications, and alternatives.

In some embodiments, measurements of received power as a function of the handheld controller position can be utilized to determine the distance between the handheld controller and the AR headset. This embodiment is described in relation to FIGS. 7A and 7B.

FIG. 7A schematically illustrates an example of variation in received signal as a function of two emitter positions, according to some embodiments. In FIG. 7A, the phased array emitter 710 is positioned at position $x_1$ and is characterized by a transmission pattern 711 having a central angle aligned with a vector 715. For purposes of clarity, only the central or main lobe of the transmission pattern is illustrated. The electromagnetic field sensor 720 is positioned a given distance from the phased array emitter 710 equal to the length of vector 715 and beam lock has been achieved for the phased array emitter at position $x_1$ ($Tx(x_1)$).

Referring to FIG. 7A, phased array emitter 712 is illustrated after it has been translated to position $x_2$ ($Tx(x_2)$). The position translation information can be obtained by analyzing IMU data generated by the handheld controller and transmitted to the AR headset since this IMU data can be used to track handheld controller pose. In some embodiments, IMU data related to handheld controller pose is fused with measurements of the electromagnetic power received by the AR headset to provide handheld controller pose values. After translation, if the transmission pattern is maintained given the new phased array emitter position (i.e., $x_2$), the power received at electromagnetic field sensor 720 will decrease as illustrated by a vector 717 in FIG. 7A, intersecting the main lobe at position 718. Because the main lobe amplitude is significantly decreased at the position 718, a function can be generated that correlates translation distance with received power for the given distance.

FIG. 7B schematically illustrates an example of variation in received signal as a function of two emitter positions, according to some embodiments. In FIG. 7B, the distance equal to the length of a vector 735 is greater than the distance equal to the length of the vector 715 illustrated in FIG. 7A. In FIG. 7B, the phased array emitter 730 is positioned at position $x_1$ and is characterized by a transmission pattern 731 having a central angle aligned with the vector 735. For purposes of clarity, only the central or main lobe of the transmission pattern is illustrated. The electromagnetic sensor 740 is positioned at a distance equal to the length of the vector 735 from the phased array emitter 730 and beam lock has been achieved for the phased array emitter 730 at position $x_1$ ($Tx(x_1)$).

Also illustrated in FIG. 7B, the phased array emitter 732 is illustrated after it has been translated to position $x_2$ ($Tx(x_2)$). The position translation information can be obtained by analyzing IMU data generated by the handheld controller. After translation, if the transmission pattern is maintained given the new phased array emitter position (i.e., $x_2$), the power received at the electromagnetic sensor 740 will decrease as illustrated by a vector 737 in FIG. 7B, intersecting the main lobe at a position 738. Because of the greater distance between the electromagnetic emitter and electromagnetic sensor in FIG. 7B compared to FIG. 7A, the decrease in received power for a given translation (i.e., from position $x_1$ to position $x_2$), is reduced compared to the decrease in received power for the same translation in FIG. 7A. Accordingly, an additional function can be generated that correlates translation distance with received power for the larger given distance illustrated in FIG. 7B. By measuring received power at a variety of translation distances, it is possible to generate a lookup table, an equation, or other mathematical construct that maps the increase or decrease in received power as a function of (1) translation distance and (2) the phased array emitter to electromagnetic sensor distance. As a result, given the received power increase or decrease and the translation distance, the distance between the phased array emitter to electromagnetic field sensor can be computed. In some embodiments, the values discussed above can be utilized to map a power derivative function:

$$P(x) = \frac{d(\text{Power Received})}{d(\text{Emitter Position})},$$

that can be used to determine the distance between the phased array emitter and the electromagnetic field sensor as a function of received power and translation distance. Thus, embodiments of the present disclosure can utilize changes in position of the handheld controller, as well as changes in orientation of the handheld controller to determine emitter to sensor distance.

It should be noted that in some embodiments, the increase or decrease in received power as a function of changes in the position of the handheld controller, which is utilized to determine emitter to sensor distance, is performed in a short period of time compared to the active tracking loop that can redirect the steerable. Thus, embodiments enable distance measurements in conjunction with active tracking as discussed, for example, with respect to FIG. 6.

In some embodiments, the functionality of the handheld controller is enhanced utilizing information collected and/or available at the handheld controller. For example, if a change in IMU data is determined at the handheld controller, for example, a determination that the handheld controller has been translated in a given direction by a given amount or rotated around a given axis by a given amount, beam steering can be initiated at the handheld controller in advance of feedback being received from the electromagnetic field sensors in the AR headset. Thus, embodiments of the present disclosure in which the handheld controller performs beam steering in response to feedback from the AR headset, as well as embodiments in which the handheld controller initiates beam steering in response to data measured and/or available at the handheld controller are included within the scope of the present disclosure. Moreover, combinations of these approaches are included within the scope of the present disclosure. As an example, in an implementation in which IMU measurements at the handheld controller result in beam steering being initiated at the handheld controller, feedback received from the AR headset can be utilized after the initiation of beam steering as an element of the control system for the beam steering process.

In some embodiments, in addition to the beam angle and the distance between the handheld controller and the AR headset computed using beam steering as described above, IMUs incorporated in the handheld controller can be utilized to provide information on handheld controller pose that can be integrated with the beam angle and the distance between the handheld controller and the AR headset computed above. One of ordinary skill in the art would recognize many variations, modifications, and alternatives.

Returning to FIG. 6, using the position of the AR headset, specifically, the position of the electromagnetic field sensor in the x-y-z coordinate system, the angle θ between the handheld controller and the AR headset, and the distance from the handheld controller to the AR headset, the six DoF pose of the handheld controller can be determined (640). The position of the AR headset can be determined from the head pose of the AR headset, which is typically tracked using IMUs in the AR headset. Based on the known position of AR headset, the position of the handheld controller can be determined, given the beam angle and the distance between the handheld controller and the AR headset. Moreover, the angle of the beam with respect to the plane of the phased array elements (i.e., the y-z plane as illustrated in FIG. 5A) can be used to determine the orientation of the handheld controller, resulting in the determination of the six DoF pose (i.e., position and orientation). In some embodiments, data from the handheld controller IMUs can be utilized to remove ambiguity in the handheld controller orientation in situations in which rotation of the AR headset and totem around the z-axis can result in a given distance and beam angle not distinguishing a unique handheld controller pose. In some embodiments, given the head pose (i.e., the pose of the AR headset), the distance and beam angle are sufficient to determine the handheld controller pose.

Given the handheld controller position, active tracking of the handheld controller position and orientation (i.e., pose) can be performed (650). Thus, once the six DoF pose of the handheld controller has been determined, active tracking of the handheld controller six DoF pose can be performed to update the six DoF pose as a function of time. As an example, using the communication path between the AR headset and the handheld controller, motion of the handheld controller and/or the AR headset will result in decreases in received power as the vector aligned with the main lobe and the vector between the handheld controller and the AR headset become misaligned. Based on this measured decrease in received power communicated to the handheld controller through the communication path between the AR headset and the handheld controller, the phase delays can be adjusted to steer the beam and realign the vector aligned with the main lobe and the vector between the handheld controller and the AR headset.

In an iterative manner, active tracking can be performed by determining the beam angle and distance and computing the six DoF pose of the handheld controller. As discussed above, the step size of the beam deviation can be adjusted during this active tracking process. Accordingly, as either the AR headset or the handheld controller move, active tracking can maintain the beam angle in real time based on feedback so that the beam angle aligns with the direction between the AR headset and the handheld controller.

Figure 8:
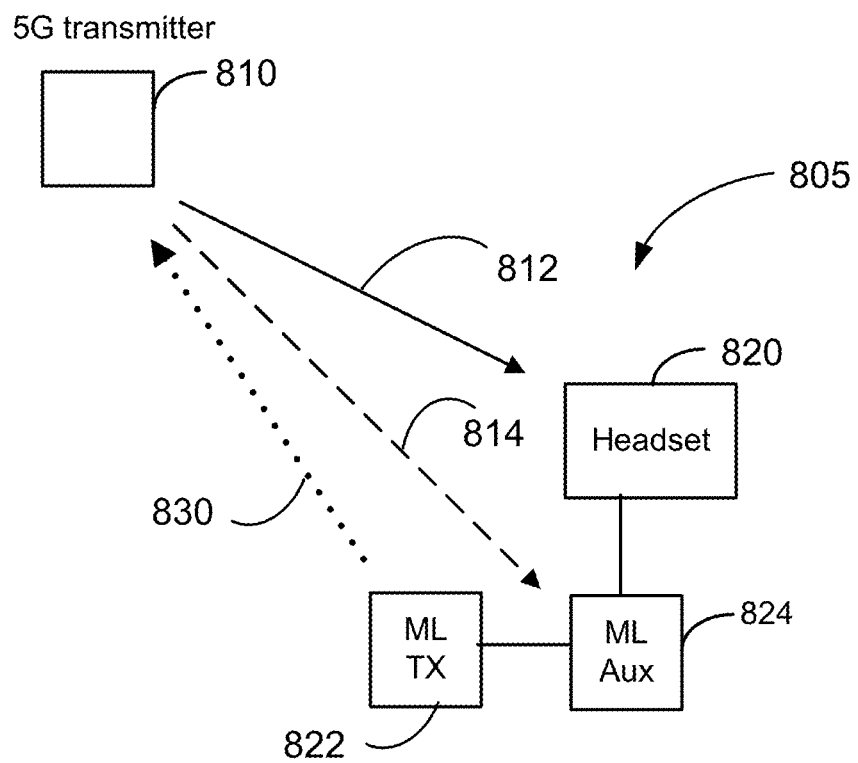
FIG. 8 schematically illustrates an augmented reality system in communication with a 5G cellular mobile communications system.

FIG. 8 schematically illustrates an augmented reality system in communication with a 5G cellular mobile communications system. As illustrated in FIG. 8, a 5G transmitter 810, also referred to as a small cell (e.g., a femtocell, a picocell, or a microcell), is in communication with an AR system 805 including an AR headset 820, an electromagnetic handheld controller 822, and an auxiliary unit 824. Communications devices, for example, 5G devices, are thus included in the AR system in some embodiments of the present disclosure. Referring to FIGS. 3 and 8, the AR headset 820, the electromagnetic handheld controller 822, and the auxiliary unit 824 illustrated in FIG. 8 may correspond to the AR headset 301, the electromagnetic field emitter 302, and the belt pack 370 illustrated in FIG. 3, respectively.

As illustrated in FIG. 8, beamforming can be utilized by the 5G transmitter 810 to direct the communication path from the 5G transmitter to the AR system 805, for example, along the beam path 812 for communication with the AR headset 820 or along the beam path 814 for communication with the auxiliary unit 824. In some implementations, the spatial proximity of the various elements of the AR system 805 are close enough to each other that the beamforming performing by the 5G transmitter 810 is characterized by a single beam path connecting the 5G transmitter and the AR system without the specificity in relation to particular elements of the AR system.

By implementing beamforming in the communication path between the 5G transmitter 810 and the AR system 805, increased data rates, lower latency, and other benefits can be provided. Moreover, beamforming can be performed at the AR system 805 for communication with the 5G transmitter 810 as illustrated by the beam path 830. Although beamforming at the handheld controller is illustrated by the beam path 830, embodiments of the present disclosure can also utilize beamforming at the auxiliary unit or the AR headset to facilitate communication with the 5G transmitter. Thus, in addition to beamforming performed at the 5G transmitter to facilitate communications with the AR system, beamforming can be performed at one or more elements of the AR system to facilitate communications with the 5G transmitter. Moreover, beamforming can be performed at one or more of the elements of the AR system, including the AR headset, the handheld controller, and/or the auxiliary unit. One of ordinary skill in the art would recognize many variations, modifications, and alternatives.

In some embodiments, the position of the 5G transmitter or other suitable communications hub is known in a predetermined coordinate space (e.g., an X-Y-Z Cartesian coordinate space). Given this known position of the 5G transmitter, the AR system can utilize the communication path between the 5G transmitter and the AR system, for example, using beam steering, to determine the position of the AR system (or elements of the AR system) with respect to the known position of the 5G transmitter. As an example, when communication is established between the 5G transmitter and the auxiliary unit of the AR system, the position of the auxiliary unit with respect to the known position of the 5G transmitter can be determined. Thus, for example, during an initialization process for the AR system, the position of the AR system can be determined. Although 5G is illustrated in FIG. 8, embodiments of the present disclosure are not limited to this particular communications standard and other communication hubs having a known position can be utilized within the scope of the present disclosure. Conversely, once the 5G transmitter and the AR system establish their relative positions, the AR system may use information that it independently collects about its changing position or pose in order to more accurately perform beam steering along beam path 830, and may communicate such information about its changing position or pose to the 5G transmitter in order for the 5G transmitter to more accurately perform beam steering along the beam paths 812 and 814.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An electromagnetic tracking system comprising:
  a handheld controller including an electromagnetic emitter, the electromagnetic emitter including:
    a first phased array element characterized by a first phase; and
    a second phased array element characterized by a second phase different than the first phase;
  wherein the first phased array element and the second phased array element are configured to generate a steerable electromagnetic beam characterized by an electromagnetic field pattern;

a head mounted augmented reality display including an electromagnetic sensor configured to sense the electromagnetic field pattern; and one or more processors configured to:
- determine a pose of the electromagnetic sensor;
- control the first phase and the second phase to steer the electromagnetic beam to increase received power at the electromagnetic sensor; and
- determine a pose of the handheld controller using the pose of the electromagnetic sensor and the electromagnetic field pattern sensed at the electromagnetic sensor.

2. The electromagnetic tracking system of claim 1, wherein the one or more processors are further configured to:
- digitally compute a position and orientation of the handheld controller based on the electromagnetic field pattern.

3. The electromagnetic tracking system of claim 1, wherein at least one of the one or more processors is disposed in the handheld controller.

4. The electromagnetic tracking system of claim 1, further comprising an auxiliary unit including the handheld controller.

5. The electromagnetic tracking system of claim 4, wherein the auxiliary unit comprises a belt pack.

6. The electromagnetic tracking system of claim 1, wherein the electromagnetic emitter further comprises a third phased array element, wherein the first phased array element, the second phased array element, and the third phased array element are disposed in a plane.

7. The electromagnetic tracking system of claim 6, wherein the electromagnetic emitter further comprises a fourth phased array element, wherein the first phased array element, the second phased array element, and the third phased array element form three corners of a tetrahedron and the fourth phased array element forms a fourth corner of the tetrahedron.

8. A method of determining a six degree of freedom (DoF) pose of a handheld controller, the method comprising:
- determining a pose of an electromagnetic sensor;
- generating an electromagnetic beam from the handheld controller, wherein the electromagnetic beam is characterized by an electromagnetic field pattern;
- steering the electromagnetic beam to increase received power at the electromagnetic sensor;
- determining a beam angle associated with the electromagnetic beam;
- determining a distance between the handheld controller and the electromagnetic sensor; and
- determining the six DoF pose of the handheld controller using the pose of the electromagnetic sensor, the beam angle, and the distance.

9. The method of claim 8, wherein the handheld controller includes an electromagnetic emitter, the electromagnetic emitter including:
- a first phased array element configured to operate with a first phase; and
- a second phased array element configured to operate with a second phase.

10. The method of claim 9, wherein the electromagnetic emitter further includes a third phased array element, wherein the first phased array element, the second phased array element, and the third phased array element are disposed in a plane.

11. The method of claim 8, wherein the pose of the electromagnetic sensor comprises a head pose and the electromagnetic sensor is an element of an AR headset.

12. The method of claim 8, wherein steering the electromagnetic beam comprises aligning a central vector of the electromagnetic beam with a vector from the handheld controller to the electromagnetic sensor.

13. The method of claim 8, wherein steering the electromagnetic beam to increase received power at the electromagnetic sensor comprises maximizing received power at the electromagnetic sensor.

14. A non-transitory computer-readable medium comprising instructions that, when executed by one or more processors, cause the one or more processors to perform operations comprising:
- determining a pose of an electromagnetic sensor;
- generating an electromagnetic beam from a handheld controller, wherein the electromagnetic beam is characterized by an electromagnetic field pattern;
- steering the electromagnetic beam to increase received power at the electromagnetic sensor;
- determining a beam angle associated with the electromagnetic beam;
- determining a distance between the handheld controller and the electromagnetic sensor; and
- determining a six degree of freedom (DoF) pose of the handheld controller using the pose of the electromagnetic sensor, the beam angle, and the distance.

15. The non-transitory computer-readable medium of claim 14, wherein the handheld controller includes an electromagnetic emitter, the electromagnetic emitter including:
- a first phased array element configured to operate with a first phase; and
- a second phased array element configured to operate with a second phase.

16. The non-transitory computer-readable medium of claim 15, wherein the electromagnetic emitter further includes a third phased array element, wherein the first phased array element, the second phased array element, and the third phased array element are disposed in a plane.

17. The non-transitory computer-readable medium of claim 14, wherein the pose of the electromagnetic sensor comprises a head pose and the electromagnetic sensor is an element of an AR headset.

18. The non-transitory computer-readable medium of claim 14, wherein steering the electromagnetic beam comprises aligning a central vector of the electromagnetic beam with a vector from the handheld controller to the electromagnetic sensor.

19. The non-transitory computer-readable medium of claim 14, wherein steering the electromagnetic beam to increase received power at the electromagnetic sensor comprises maximizing received power at the electromagnetic sensor.

20. An electromagnetic tracking system comprising:
- a handheld controller including an electromagnetic emitter, the electromagnetic emitter including:
  - a first phased array element characterized by a first phase; and
  - a second phased array element characterized by a second phase different than the first phase;
  - a third phased array element, wherein the first phased array element, the second phased array element, and the third phased array element are disposed in a plane; and
  - a fourth phased array element, wherein the first phased array element, the second phased array element, and the third phased array element form three corners of a tetrahedron and the fourth phased array element forms a fourth corner of the tetrahedron;

wherein the first phased array element, the second phased array element, the third phased array element, and the fourth phased array element are configured to generate a steerable electromagnetic beam characterized by an electromagnetic field pattern; and a head mounted augmented reality display including an electromagnetic sensor configured to sense the electromagnetic field pattern.

* * * * *